United States Patent
Bonavides et al.

(10) Patent No.: US 9,523,271 B2
(45) Date of Patent: Dec. 20, 2016

(54) WIRELESS COMMUNICATION FOR DOWNHOLE TOOL STRINGS

(71) Applicant: Halliburton Energry Sevices, Inc., Houston, TX (US)

(72) Inventors: Clovis S Bonavides, Houston, TX (US); William George Dillon, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 92 days.

(21) Appl. No.: 14/429,219

(22) PCT Filed: Sep. 21, 2012

(86) PCT No.: PCT/US2012/056570
§ 371 (c)(1),
(2) Date: Mar. 18, 2015

(87) PCT Pub. No.: WO2014/046670
PCT Pub. Date: Mar. 27, 2014

(65) Prior Publication Data
US 2015/0226057 A1    Aug. 13, 2015

(51) Int. Cl.
*E21B 43/116* (2006.01)
*E21B 47/12* (2012.01)
(Continued)

(52) U.S. Cl.
CPC ........... *E21B 47/122* (2013.01); *E21B 43/116* (2013.01); *E21B 43/1185* (2013.01); *G01V 1/06* (2013.01);
(Continued)

(58) Field of Classification Search
CPC ..... E21B 43/11; E21B 43/116; E21B 43/1185; F42D 1/04; H04W 24/00
(Continued)

(56) References Cited

U.S. PATENT DOCUMENTS 4,480,690 A   11/1984  Vann
4,616,701 A   10/1986  Stout et al.
(Continued)

FOREIGN PATENT DOCUMENTS

WO    2011123748 A2   10/2011

OTHER PUBLICATIONS

International Searching Authority, International Search Report and Written Opinion, International application No. PCT/US12/56570, which is the PCT parent of the instant application, Dec. 24, 2012.
(Continued)

*Primary Examiner* — Steven Lim
*Assistant Examiner* — Benyam Haile
(74) *Attorney, Agent, or Firm* — Howard L. Speight, PLLC

(57) ABSTRACT

A wireline interface sub includes a wireline-interface-sub housing mechanically coupleable to a wireline and a wireline-interface module electrically coupleable to the wireline. A first tandem sub includes a first-tandem-sub housing mechanically coupled to the wireline-interface-sub housing, a first-tandem-sub-upside transceiver wirelessly coupled to the wireline-interface module, and a first-tandem-sub-downside transceiver electrically coupled to the first-tandem-sub-upside transceiver. A first gun sub includes a first-gun-sub housing mechanically coupled to the first-tandem-sub housing, a first-gun-sub transceiver wirelessly coupled to the first-tandem-sub-downside transceiver, and a first-gun-sub detonator coupled to, and triggerable by, the first-gun-sub transceiver.

19 Claims, 7 Drawing Sheets

(51) Int. Cl.
  *E21B 43/1185* (2006.01)
  *G01V 1/06* (2006.01)
  *F42D 1/04* (2006.01)
  *F42D 1/02* (2006.01)
  *E21B 43/11* (2006.01)

(52) U.S. Cl.
  CPC .................. *E21B 43/11* (2013.01); *F42D 1/02* (2013.01); *F42D 1/04* (2013.01); *G01V 2210/1216* (2013.01)

(58) Field of Classification Search
  USPC ........ 166/297, 298; 102/301, 312, 313, 314, 102/331, 332; 340/853.1, 854.3, 854.5, 340/854.9
  See application file for complete search history.

(56) References Cited

U.S. PATENT DOCUMENTS

| | | | |
|---|---|---|---|
| 4,656,944 A | 4/1987 | Gonzalez | |
| 7,066,261 B2 | 6/2006 | Yarbo | |
| 7,980,309 B2 | 7/2011 | Crawford | |
| 2001/0043509 A1 | 11/2001 | Green et al. | |
| 2003/0000703 A1 | 1/2003 | Cernocky et al. | |
| 2004/0206503 A1 | 10/2004 | Bell et al. | |
| 2006/0117113 A1 | 6/2006 | Elliott et al. | |
| 2007/0019574 A1 | 1/2007 | Huang | |
| 2007/0029112 A1 | 2/2007 | Li et al. | |
| 2008/0231466 A1 | 9/2008 | Mazrooee et al. | |
| 2009/0045974 A1 | 2/2009 | Patel | |
| 2009/0050322 A1 | 2/2009 | Hill et al. | |
| 2009/0084535 A1 | 4/2009 | Bertoja et al. | |
| 2010/0000789 A1 | 1/2010 | Barton et al. | |
| 2010/0133004 A1 | 6/2010 | Burleson et al. | |
| 2010/0219980 A1 | 9/2010 | Snider et al. | |
| 2011/0176387 A1 | 7/2011 | Froelich | |
| 2011/0199228 A1 | 8/2011 | Roddy et al. | |

OTHER PUBLICATIONS

University of Florida—Department of Physics PHY4803L—Advance Physics Laboratory, Gamma Ray Spectroscopy, Experiment GRS, Oct. 31, 2011.

WIRELESS COMMUNICATION FOR DOWNHOLE TOOL STRINGS

BACKGROUND

An oil well typically goes through a "completion" process after it is drilled. Casing is installed in the well bore and cement is poured around the casing. This process stabilizes the well bore and keeps it from collapsing. Part of the completion process involves perforating the casing and cement so that fluids in the formations can flow through the cement and casing and be brought to the surface. The perforation process is often accomplished with a perforation apparatus including a plurality of subs, some of which contain shaped explosive charges. It can be a challenge to properly assemble the perforation apparatus on the surface.

DETAILED DESCRIPTION

This application describes a wireless technique for communicating with and within a downhole tool string. While the description is primarily written about a perforation system, the same techniques can be applied to provide communication with and among tools in any tool string including wireline, logging while drilling, testing, and other downhole tools.

Figure 1:
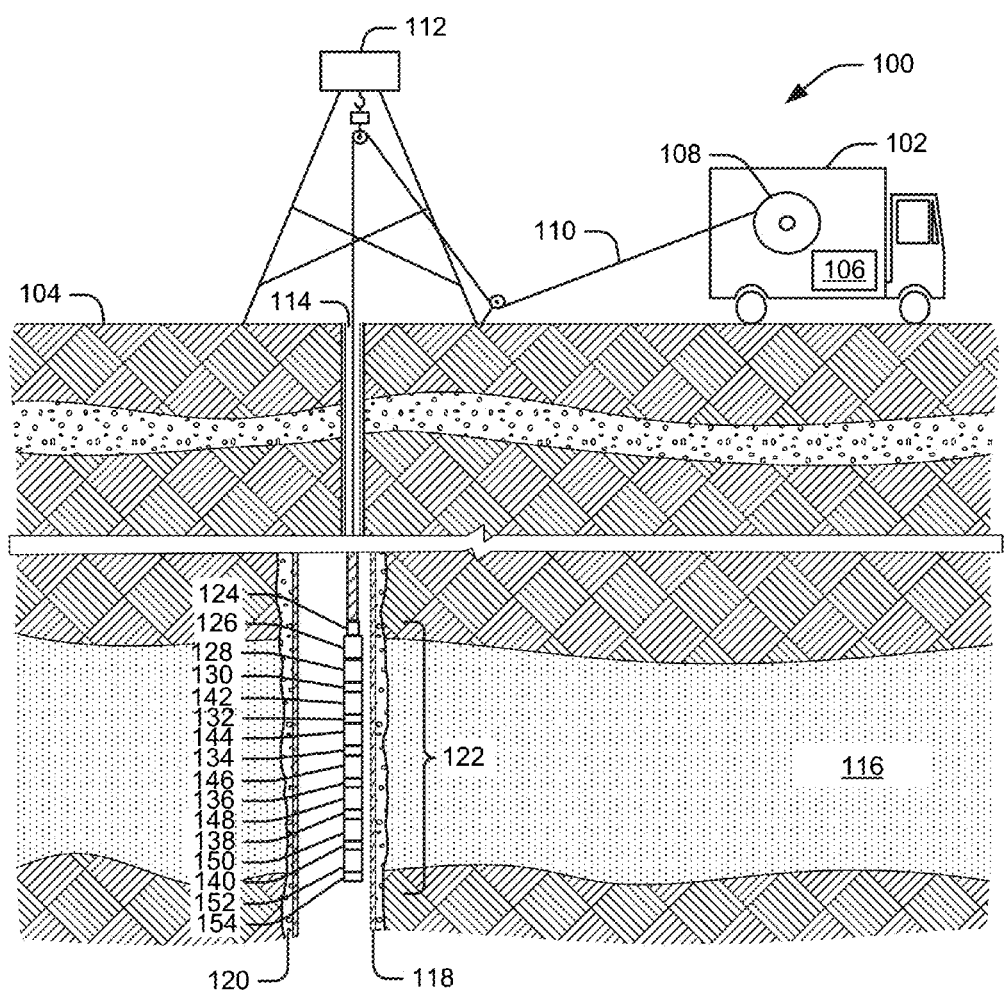
FIG. 1 illustrates a perforation system.

In one embodiment of a perforation system 100 at a drilling site, as depicted in FIG. 1, a logging truck or skid 102 on the earth's surface 104 houses a shooting panel 106 and a winch 108 from which a cable 110 extends through a derrick 112 into a borehole well bore 114 drilled into a hydrocarbon-producing formation 116. In one embodiment, the derrick 112 is replaced by a truck with a crane (not shown). In one embodiment, the well bore 114 is lined with casing 118 and cement 120. In one embodiment, the cable 110 suspends a perforation apparatus 122 within the well bore 114.

Figure 2:
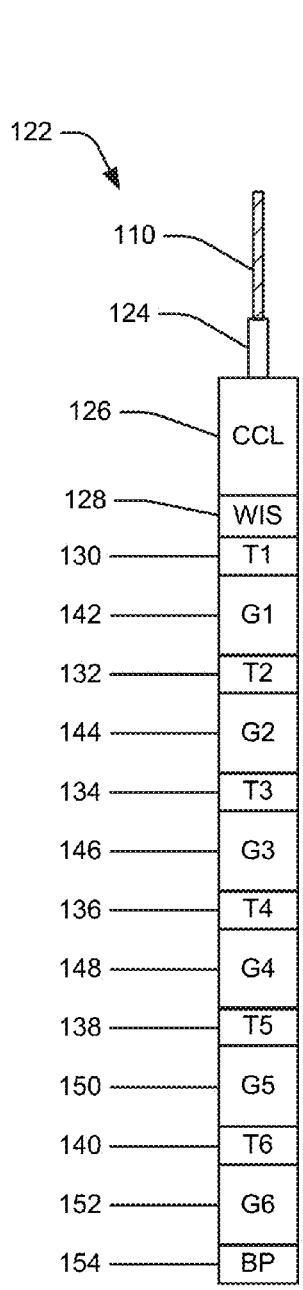
FIG. 2 illustrates a perforation apparatus.

In one embodiment shown in FIGS. 1 and 2, the perforation apparatus 122 includes a cable head/rope socket 124 to which the cable 110 is coupled. In one embodiment, an apparatus to facilitate fishing the perforation apparatus (not shown) is included above the cable head/rope socket 124. In one embodiment, the perforation apparatus 122 includes a casing collar locator ("CCL") 126, which facilitates the use of magnetic fields to locate the thicker metal in the casing collars (not shown). The information collected by the CCL can be used to locate the perforation apparatus 122 in the well bore 114. A gamma-perforator (not shown), which includes a CCL, may be included as a depth correlation device in the perforation apparatus 122.

In one embodiment, the perforation apparatus 122 includes a wireline interface sub ("WIS") 128 that provides an electrical and control interface between the shooting panel 106 on the surface and the rest of the equipment in the perforation apparatus 122. In one embodiment, the shooting panel 106 and the rest of the equipment in the perforation apparatus 122 (i.e., the equipment not described in detail below) is conventional.

In one embodiment, the perforation apparatus 122 includes a plurality of tandem subs ("T1," "T2," "T3," "T4," "T5," and "T6") 130, 132, 134, 136, 138, 140 and a plurality of gun subs ("G1," "G2," "G3," "G4," "G5," and "G6") 142, 144, 146, 148, 150, 152. In one embodiment, the number of tandem subs is equal to the number of gun subs.

It will be understood by persons of ordinary skill in the art that the number of tandem subs and gun subs shown in FIGS. 1 and 2 is merely illustrative and is not a limitation. Any number of tandem subs and gun subs can be included in the perforation apparatus 122.

In one embodiment, the perforation apparatus 122 includes a bull plug ("BP") 154 that facilitates the downward motion of the perforation apparatus 122 in the well bore 114 and provides a pressure barrier for protection of internal components of the perforation apparatus 122. In one embodiment, the perforation apparatus 122 includes magnetic decentralizers (not shown) that are magnetically drawn to the casing causing the perforation apparatus 122 to draw close to the casing as shown in FIG. 1. In one embodiment, a setting tool (not shown) is included to deploy and set a bridge or frac plug in the well bore 114.

In one embodiment, the wireline interface sub 128 includes a wireline-interface-sub housing 302 that is mechanically coupleable to the wireline cable 110. In one embodiment, such as that shown in FIG. 2, the wireline-interface-sub housing 302 is mechanically coupleable to the wireline cable 110 through the casing collar locator 126 and the cablehead/rope socket 124.

Figure 3:
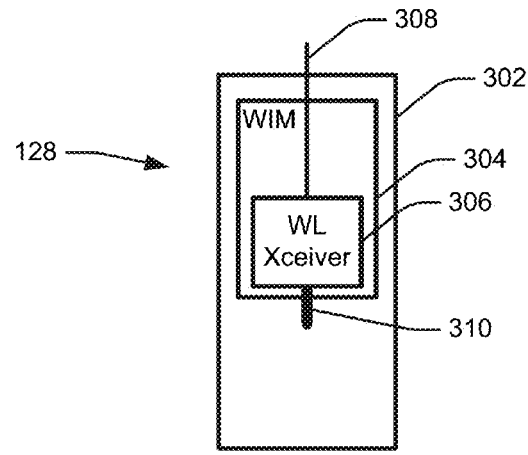
FIG. 3 is a block diagram of a wireline interface sub.

In one embodiment, shown in FIG. 3, the wireline interface sub 128 includes a wireline-interface module (or "WIM") 304 that includes a wireline-interface-module transceiver 306 that is electrically coupleable to the wireline cable 110. In one embodiment, the wireline cable 110 includes a signal path (not shown) through which signals from the shooting panel 106 or other equipment on the surface can be passed to the perforation apparatus 122. In one embodiment, a signal interface 308 provides an interface between wireline cable 110 and the wireline-interface-module transceiver 306 through the cable head/rope socket 124 and the casing collar locator 126. In one embodiment, the signal interface 308 is a coax cable.

In one embodiment, the wireline-interface-module transceiver 306 is a standard transceiver that is used throughout the perforation apparatus 122 as will be seen below.

In one embodiment, the wireline-interface-module transceiver 306 is capable of transmitting and receiving a radio frequency ("RF") signal in the wireline-interface-sub housing 302 through a wireline-interface-module antenna 310. In one embodiment, the wireline-interface-sub housing 302 is constructed of metal, such as steel, and is sealed to prevent the RF signal from leaking outside the wireline-interface-sub housing 302, for example into the well bore 114. In one embodiment, the wireline-interface-sub housing 302 is sealed to form a Faraday shield.

In one embodiment the RF signals used throughout the perforation apparatus 122 are in the high frequency ("HF")

band from 30-300 MHz. In one embodiment, the RF signals are frequency-modulated or phase-modulated at a typical digital bit rate of 100 kilo bit per second ("kbs") to 1 mega bit per second ("Mbs"). In one embodiment, the data rate is set at a higher or lower rate depending on, for example, environmental factors, such as noise, reflections from obstacles, transmission distance, etc. In one embodiment, the digital data is coded into symbols, such as standard ASCII symbols.

In one embodiment, optical transmissions, such as infrared transmission or transmission via optical fiber, is used instead of RF signals.

Figure 4:
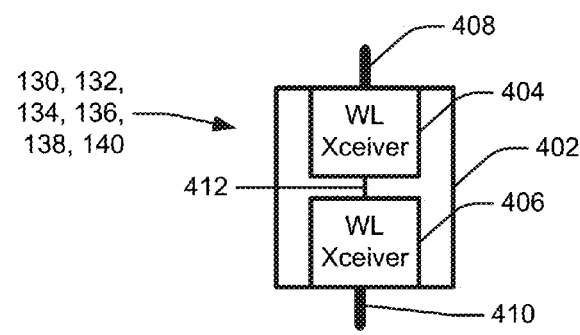
FIG. 4 is a block diagram of a tandem sub.

In one embodiment, shown in FIG. 4, the tandem subs 130, 132, 134, 136, 138, 140 include a tandem-sub housing 402 that is mechanically coupleable to the wireline interface sub 128 for example by a threaded connection. In one embodiment, the tandem-sub housing 402 contains a tandem-sub-upside transceiver 404 and a tandem-sub-downside transceiver 406. In one embodiment, when the tandem subs 130, 132, 134, 136, 138, 140 are installed in the perforation apparatus 122, the tandem-sub-upside transceiver 404 is closer to the connection to the wireline cable 110 and the tandem-sub-downside transceiver 406 is farther away from the wireline cable 110. In one embodiment, this convention is arbitrary and the tandem subs 130, 132, 134, 136, 138, 140 can be installed in either orientation.

In one embodiment, the tandem subs 130, 132, 134, 136, 138, 140 include a tandem-sub-upside antenna 408 that is electrically coupled to the tandem-sub-upside transceiver 404 and extends outside the tandem-sub housing 402. In one embodiment, the tandem-sub-upside antenna 408 is detachable from the tandem-sub-upside transceiver 404 and the tandem-sub housing 402, for example by a screw attachment or a bayonet attachment (not shown). In one embodiment, the tandem subs 130, 132, 134, 136, 138, 140 include a tandem-sub-downside antenna 410 that is electrically coupled to the tandem-sub-downside transceiver 406 and extends outside the tandem-sub housing 402. In one embodiment, the tandem-sub-downside antenna 410 is detachable from the tandem-sub-downside transceiver 406 and the tandem-sub housing 402, for example by a screw attachment or a bayonet attachment (not shown). In one embodiment, a tandem-sub cable 412 electrically couples the tandem-sub-upside transceiver 404 to the tandem-sub-downside transceiver 406. In one embodiment, the tandem-sub cable 412 is a coax cable.

In one embodiment, the tandem-sub-upside transceiver 404 and the tandem-sub-downside transceiver 406 are capable of transmitting and receiving RF signals through the tandem-sub-upside antenna 408 and the tandem-sub-downside antenna 410, respectively.

Figure 5:
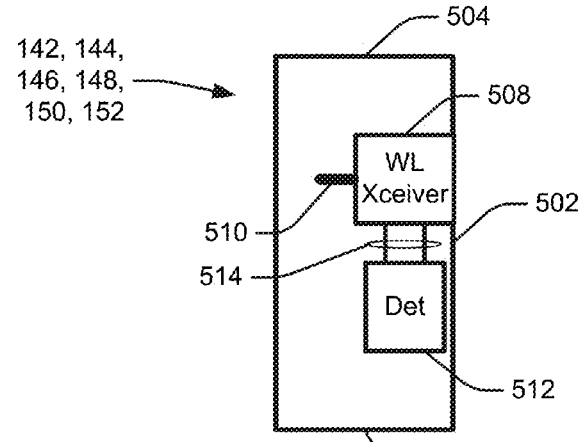
FIG. 5 is a block diagram of a gun sub.
Figure 6:
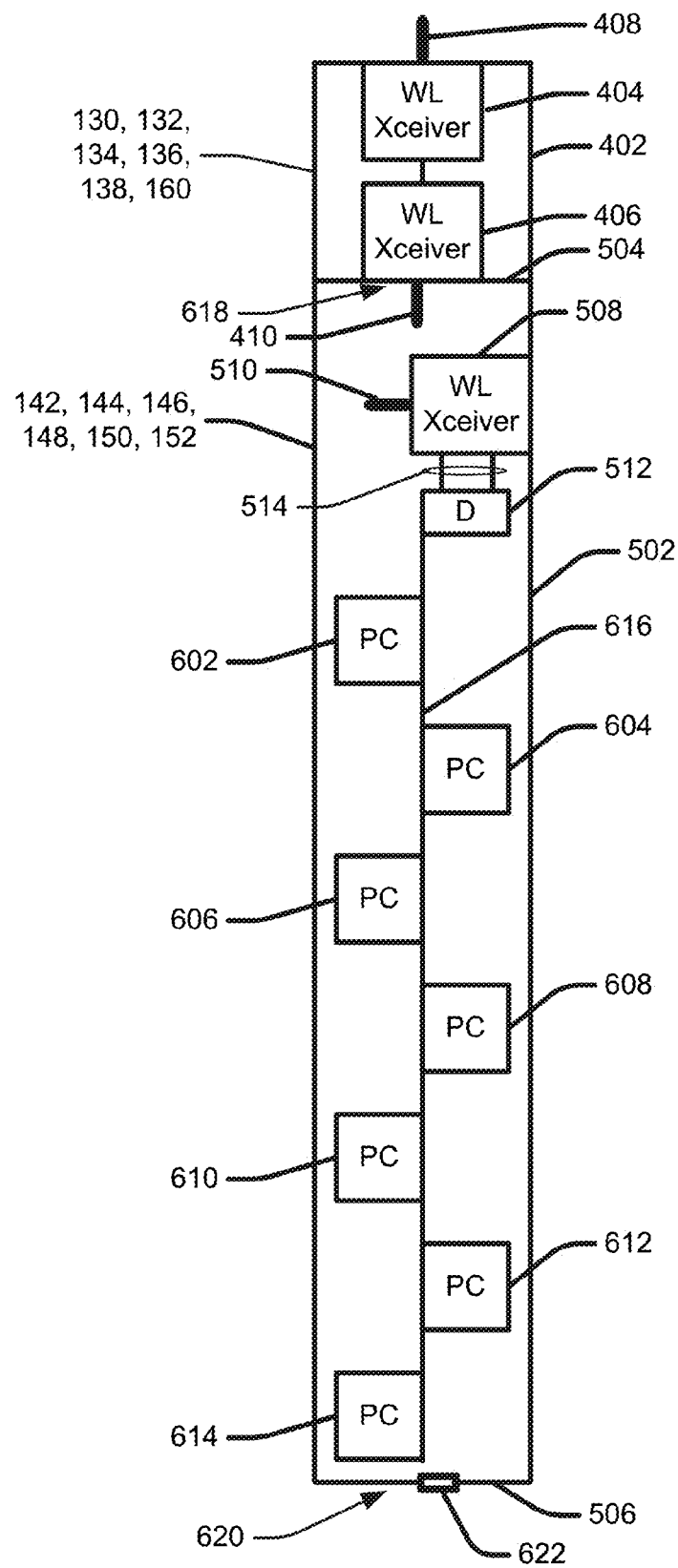
FIG. 6 is a block diagram of a gun sub coupled to a tandem sub.

In one embodiment, shown in FIG. 5, the gun subs 142, 144, 146, 148, 150, 152 each include a gun-sub housing 502 (note that FIG. 6 shows additional detail concerning the gun subs). In one embodiment, the gun-sub housing 502 has a first end 504 and a second end 506. In one embodiment, the first end 504 of the gun-sub housing 502 is mechanically coupleable to a tandem sub 130, 132, 134, 136, 138, 140 for example by a threaded connection. In one embodiment, the second end 506 of the gun-sub housing 502 is mechanically coupleable to a tandem sub 130, 132, 134, 136, 138, 140 for example by a threaded connection.

In one embodiment, the gun-sub housing 502 contains a gun-sub transceiver 508 electrically coupled to a gun-sub antenna 510. In one embodiment, the gun-sub housing 502 contains a detonator ("Det") 512 coupled to the gun-sub transceiver 508 by gun-sub wires 514.

In one embodiment, the gun-sub transceiver 508 is capable of transmitting an RF signal into the gun-sub housing 502 through the gun-sub antenna 510. In one embodiment, the gun-sub housing 502 is constructed of metal, such as steel, and is sealed to prevent the RF signal from leaking outside the gun-sub housing 502, for example into the well bore 114. In one embodiment, the gun-sub housing 502 is sealed to form a Faraday shield.

In one embodiment, illustrated in FIG. 6, the gun subs 142, 144, 146, 148, 150, 152 each include seven perforating charges (or "PC") 602, 604, 606, 608, 610, 612, and 614. It will be understood that by a person of ordinary skill in the art that each gun sub 142, 144, 146, 148, 150, 152 can include any number of perforating charges. In one embodiment, the perforating charges are linked together by a detonating cord 616 that is attached to a detonator 618. In one embodiment, when the detonator 512 is detonated, the detonating cord 616 links the explosive event to all the perforating charges 602, 604, 606, 608, 610, 612, 614, detonating them simultaneously. In one embodiment, the primary power for the detonator 512 is a battery module. In one embodiment, a commercially available 9 volt battery provides the needed power.

In one embodiment, the tandem-sub-downside antenna 410 extends through a passage (indicated by arrow 618) in the first end 504 of the gun-sub housing 502. In one embodiment, the tandem-sub-downside transceiver is capable of transmitting an RF signal into the gun-sub housing 502 through the tandem-sub-downside antenna 410.

In one embodiment, the mechanical interface between the tandem-sub housing 402 and the gun-sub housing 502 is sealed, using, for example, a copper or other conductive metal mesh gasket and/or a conductive lubricant (not shown), to prevent the RF signals transmitted by the tandem-sub-downside transceiver 406 and the gun-sub transceiver 508 from leaking out of the gun-sub housing 502, for example into the well bore 114.

In one embodiment, the second end 506 of the gun-sub housing 502 has a passage (indicated by arrow 620) in the second end 506 of the gun-sub housing 502. In one embodiment, a plug 622 seals the second end 506 when a tandem sub 130, 132, 134, 136, 138, 140 or the bull plug 154 is not mechanically coupled to the second end 506 of the gun sub housing 502.

In one embodiment, the gun-sub transceiver 508 is shock mounted within the gun subs 142, 144, 146, 148, 150, 152. In one embodiment, each gun sub 142, 144, 146, 148, 150, 152 includes a standalone battery module (not shown). In one embodiment, the standalone battery module is a commercial battery, such as a 9-volt battery commonly available to consumers. In one embodiment, the detonator 512 is a Rig Environment Detonator ("RED" detonator), manufactured by Halliburton, that requires a small amount of power to detonate.

Figure 7:
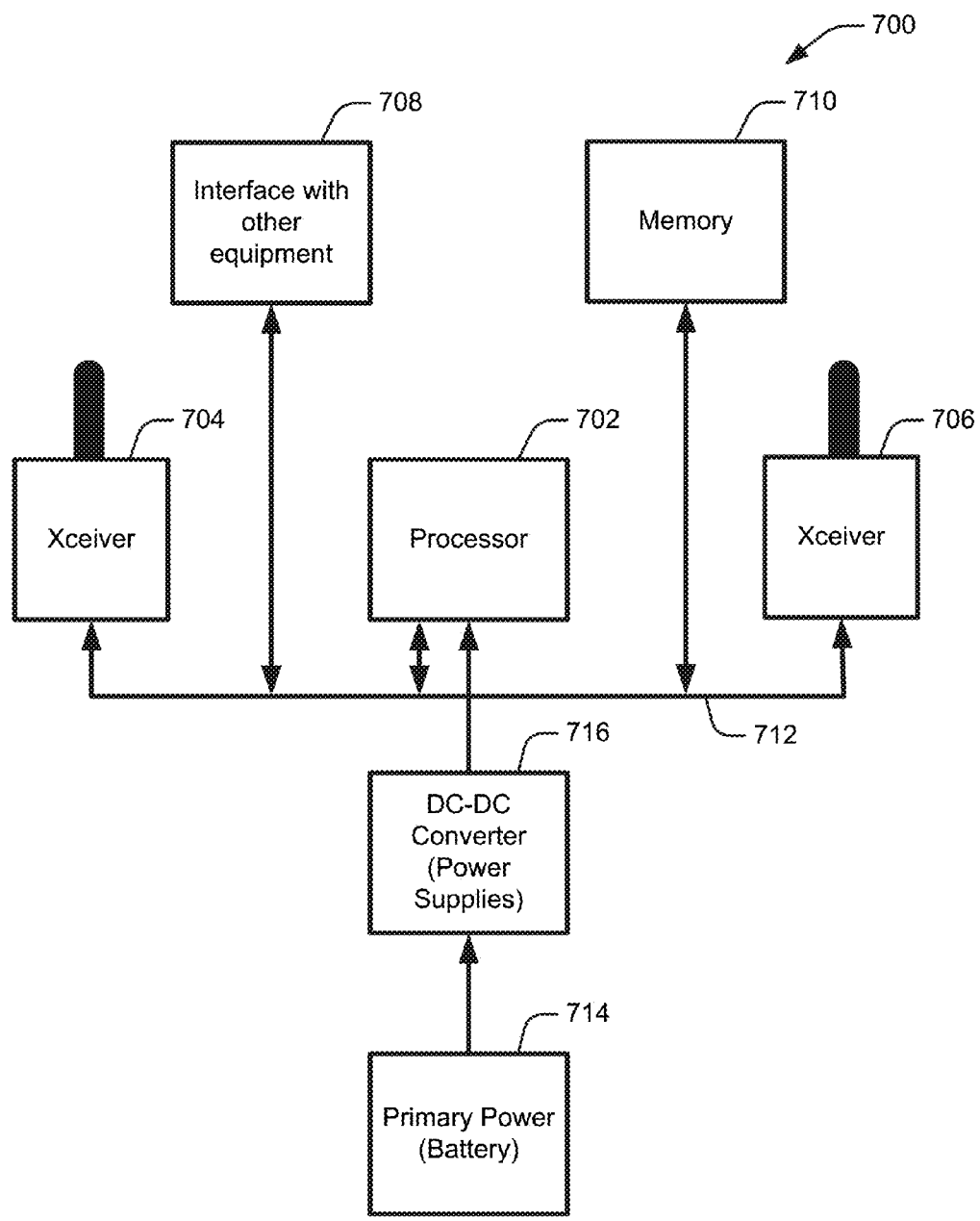
FIG. 7 is a block diagram showing common electronic elements in a wireline interface sub, a tandem sub, and a gun sub.

In one embodiment, the wireline interface sub 128, tandem subs 130, 132, 134, 136, 138, 140, and gun subs 142, 144, 146, 148, 150, 152, share elements of a common electronic block diagram 700, illustrated in FIG. 7. In one embodiment, a processor 702 communicates with two transceivers 704, 706, an interface with other equipment 708, and a memory 710 by way of a bus 712. In one embodiment, the processor 702, transceivers 704, 706, interface with other equipment 708, and memory 710 are powered by a primary power supply 714, such as a battery, through a DC-DC converter 716, such as one or more power supplies.

In one embodiment, the processor 702 executes a program stored on the memory 710 and/or in a memory or cache (not shown) within the processor 702 to execute the functions described below. In one embodiment, the processor 702 is digital logic, a programmed logic array, or the like. In one embodiment, the transceivers 704 and 706 send and receive RF signals modulated and coded with digital signals representing messages. In one embodiment, the transceivers 704 and 706 are controlled by the processor 702. In one embodiment, the processor 702 processes messages received by the transceivers 704 and 706. In one embodiment, the processor 702 prepares messages to be transmitted by the transceivers 704 and 706. In one embodiment, the processor communicates with and controls external equipment, such as the gun-sub detonator 512, through the interface with other equipment 708.

In one embodiment, the wireline interface sub 128 includes the processor 702, one transceiver 704, the interface with other equipment 708, the memory 710, the primary power 714, and the DC-DC converter 716. In one embodiment, the interface with other equipment 708 interfaces through the signal interface 308 and the wireline cable 110 to the shooting panel 106.

In one embodiment, the tandem subs 130, 132, 134, 136, 138, 140 include the two transceivers 704 and 706, the primary power 714, and the DC-DC converter 716. In one embodiment, the bus 712 in the tandem subs 130, 132, 134, 136, 138, 140 is a coax cable. In one embodiment, the tandem subs 130, 132, 134, 136, 138, 140 are simple pass-throughs and do not need the processor 702 or the memory 710.

In one embodiment, the gun subs 142, 144, 146, 148, 150, 152 include the processor 702, one transceiver 704, the interface with other equipment 708, the memory 710, the primary power 714, and the DC-DC converter. In one embodiment, multiple DC-DC converters provide various voltages. For example, in one embodiment, a 9 volt battery is converted by DC-DC converters to 3.3 volts, 5 volts, 30 volts, and 230 volts. In one embodiment, the interface with other equipment 708 provides an interface between the processor 702 and the gun-sub detonator 512. In one embodiment, the interface with other equipment 708 includes circuitry that produces a high voltage through DC/DC conversion.

In one embodiment, the tandem subs 130, 132, 134, 136, 138, 140, and the gun subs 142, 144, 146, 148, 150, 152 can be commanded by the wireline interface sub 128 into "Sleep," or "Listening," or "Wakeup" modes as necessary or useful to save power. For example, in one embodiment, the equipment is placed in the "Listening" mode when the perforating apparatus 122 is being lowered into the position shown in FIG. 1.

Figure 8:
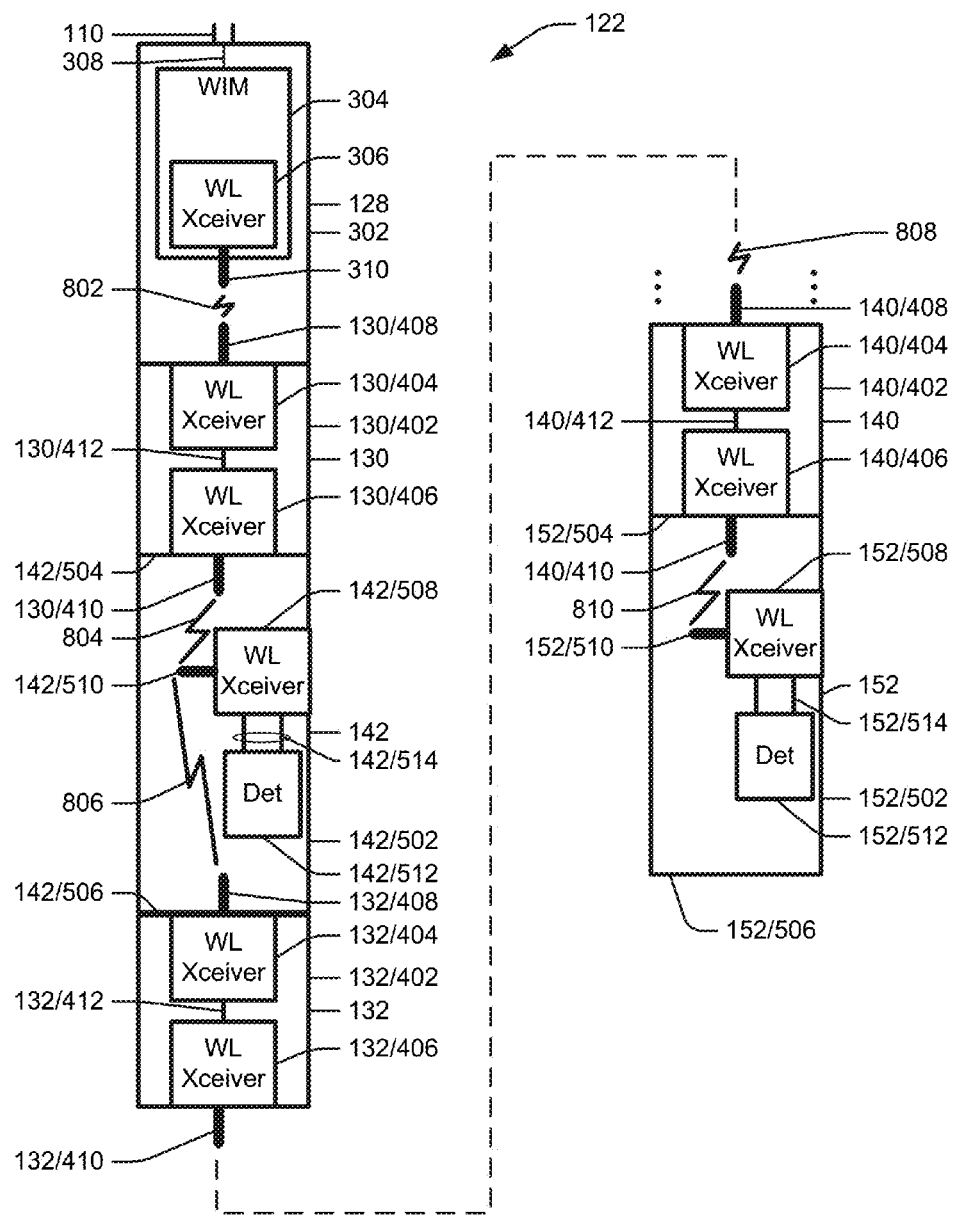
FIG. 8 is a block diagram of an example perforation apparatus.

A block diagram of the perforation apparatus 122, FIG. 8, shows one embodiment of how commands are transmitted through the perforation apparatus 122. The reference number nomenclature used in FIG. 8 is the reference numbers from FIGS. 1-5 with a slash ("/") to represent inclusion of a lower level element, such as a transceiver or a detonator, in a higher level element, such as a tandem sub or a gun sub. For example, the reference number 130/402 refers to the tandem-sub housing 402 (see FIG. 4) of tandem sub 130 (see FIG. 1). Note that, for simplicity of presentation, FIG. 8 shows the wireline cable 110 connected directly to the signal interface 308 and does not show the cable head/rope socket 124 or the casing collar locator 126. Similarly, FIG. 8 does not show the bull plug 154 or the plug 622 that might be present in the perforation apparatus 122. FIG. 8 also does not show the details present in FIG. 6 or 7.

In one embodiment, each of the gun subs 142, 144, 146, 148, 150, 152 has its own power supply. Further, in one embodiment, there is no power loss across the system because no direct connections exist between the gun subs 142, 144, 146, 148, 150, 152. In one embodiment, there is a direct connection (i.e., a wired connection) between two or more of the gun subs 142, 144, 146, 148, 150, 152. Consequently, in one embodiment, the number of gun subs 142, 144, 146, 148, 150, 152 in the perforation apparatus 122 is theoretically unlimited.

In one embodiment, the tandem subs 130, 132, 134, 136, 138, 140 and the gun subs 142, 144, 146, 148, 150, 152 have no intelligence, no sensors, and do not send or generate data. In one embodiment, the communications flow only from the wireline interface sub 128 in a downward direction as seen in FIG. 8 toward the "bottom-most" gun sub 152. In one embodiment, each transceiver, such as wireline-interface-module transceiver 306 and tandem-sub-upside transceivers 130/404 and 132/404 simply receive a message and immediately (after a short delay) transmits it, acting as a repeater. As can be seen in FIGS. 4 and 8, each tandem sub 130, 132, 134, 136, 138, 140 has a transceiver, e.g. 130/404, 132/404, and 140/404, acting as a receiver at the "top" (as that direction is seen in FIG. 8) and another transceiver, e.g. 130/406, 132/406, and 140/406, acting as a transmitter at the "bottom" (as that direction is seen in FIG. 8). In this configuration, communications flows in a single direction—from top to bottom.

In one embodiment, the gun subs 142, 144, 146, 148, 150, 152 each have a unique address. In one embodiment, the gun sub address for each gun sub 142, 144, 146, 148, 150, 152 is established using straps or jumpers on a circuit board, in silicon on a chip (not shown) that is pre-programmed or programmed after installation of the chip, or on a terminal strip (not shown) in the gun sub. In one embodiment, the address for each gun sub 142, 144, 146, 148, 150, 152 is established wirelessly. In one embodiment, the address for at least one gun sub 142, 144, 146, 148, 150, 152 is established using a wired connection.

For example, in one embodiment, a technician assembles the perforation apparatus 122 on the surface and performs an address initialization process. In one embodiment, assembly of the perforation apparatus 122 is simplified over conventional perforation systems because no wires or cables need to be connected between modules. Further, in one embodiment, the gun subs 142, 144, 146, 148, 150, 152 are not required to be placed in a particular order in the perforation apparatus 122 because, unlike in some conventional perforating systems in which the polarity of gun subs are required to alternate, order of firing of the gun subs 142, 144, 146, 148, 150, 152 in perforating system 122 is not determined upon assembly. That is, in one embodiment, because the gun subs 142, 144, 146, 148, 150, 152 are individually addressable, the gun subs 142, 144, 146, 148, 150, 152 can be fired in any order.

In one embodiment, the wireline-interface module 304 implements another automatic address assignment process. In one embodiment, the wireline-interface module knows at the beginning of the process the number (N) of gun subs 142, 144, 146, 148, 150, 152 in the system, either through a device discovery mechanism or by having the number set or loaded in by a technician. In one embodiment, referring to FIG. 8, the wireline-interface module 304 sends an address-setting message from the wireline-interface-module transceiver 306 through tandem-sub-upside transceiver 130/404 and tandem-sub-downside transceiver 130/406 to tandem-sub-upside transceiver 132/404. Tandem-sub-upside receiver signals 132/404 gun-sub transceiver 142/508 for its address. If gun-sub transceiver 142/508 responds that it does not have an address, tandem-sub-upside receiver 132/404 orders the gun-sub transceiver 142/508 to adopt the address in the address-setting message and does not propagate the address-setting message further down the perforation apparatus 122. If gun-sub transceiver 142/508 responds that it does have an address, tandem-sub-upside receiver 143/404 propagates the address-setting message down the perforation apparatus 122. Each tandem-sub-downside transceiver 406 performs the same operation causing each of the gun-sub transceivers 508 to be assigned an address in sequence. In each interval between issuing address-setting messages, the wireline-interface module 304 issues address-query messages and each gun-sub transceiver 508 that has been assigned an address responds with an address-assigned message. The wireline-interface module 304 continues issuing address-setting messages until it receives address-assigned messages from N gun-sub transceivers 508.

In one embodiment, the physical orientation of the gun subs 142, 144, 146, 148, 150, 152 relative to other devices within the perforation apparatus 122 (i.e., whether they are oriented with the gun-sub transceiver 508 at the top of the gun-sub housing (i.e. top firing), as shown in FIG. 6, or at the bottom (bottom firing)) is not important to the operation of the perforation apparatus 122 and can be decided as the perforation apparatus is being assembled.

In addition, in one embodiment, the physical orientation of the tandem subs 130, 132, 134, 136, 138, 140 within the perforation apparatus 122 can be with the tandem-sub-upside transceiver 404 closest to the surface or with the tandem-sub-downside transceiver 406 closest to the surface. In one embodiment, a switch (not shown) within the tandem subs 142, 144, 146, 148, 150, 152 establishes the tandem-sub-upside transceiver 404 as a receiver and the tandem-sub-downside transceiver 406 as a transmitter with the flow of communications on the tandem-sub cable being from the tandem-sub-upside transceiver 404 to the tandem-sub-downside transceiver 406 or the opposite. Further, in embodiments in which communications are bi-directional, either orientation of the tandem subs 130, 132, 134, 136, 138, 140 within the perforation apparatus will work.

In one embodiment in which the gun sub addresses are assigned wirelessly, when the perforation apparatus is first assembled, none of the gun subs 142, 144, 146, 148, 150, 152 have assigned addresses and all are listening for address-assignment messages via their gun-sub transceivers 508. In one embodiment, an address-setting console (not shown) is coupled to the wireline-interface module 304. In one embodiment, the address-setting console is a computer, such as a laptop computer, with software to perform the address-setting process. In one embodiment, the address-setting console is a hardware console manufactured to perform the address-setting process. In one embodiment, the address-setting console is coupled to the wireline-interface module 304 through the signal interface 308. In one embodiment, the address-setting console is coupled to the wireline-interface module 304 through a port such as a universal serial bus ("USB") port (not shown). In one embodiment, the address-setting console is used to establish within the wireline-interface module 304 the number of gun subs 142, 144, 146, 148, 150, 152 in the perforation apparatus 122.

In one embodiment, the wireline-interface module 304 transmits a first address-assignment message which includes an address to be assigned. In one embodiment, the wireline-interface module 304 indicates to a technician through the address-setting console which of the gun subs is intended to have the address just transmitted. In one embodiment, each of the gun subs 142, 144, 146, 148, 150, 152 has an indicator (not shown), such as an LED, that indicates receipt of the message. In one embodiment, the technician can troubleshoot communications within the perforation apparatus checking to see if all of the gun subs 142, 144, 146, 148, 150, 152 indicate that they have received the message.

In one embodiment, each of the gun subs 142, 144, 146, 148, 150, 152 has a switch (not shown) by which an address assignment can be accepted. In one embodiment, the technician presses the switch on the gun sub 142, 144, 146, 148, 150, 152 that is intended to be assigned the first address. That gun sub then sets its address to address in the first address-establishing message and transmits an confirmation message to the other equipment in the perforation apparatus 122. Upon receipt of the confirmation message, the other gun subs 142, 144, 146, 148, 150, 152 return to the "listening for address-assignment messages" mode and turn their indicators off. The wireline-interface module 304 receives the confirmation message, sets the address in its memory, and informs the address-setting console of the assignment. The address-setting console displays confirmation of the assignment for the technician. The technician repeats this process for each of the gun subs 142, 144, 146, 148, 150, 152.

In one embodiment, the tandem subs 130, 132, 134, 136, 138, 140 do not need addresses because they act as pass-throughs. In one embodiment, the tandem subs 130, 132, 134, 136, 138, 140 are assigned addresses in the same way the gun subs 142, 144, 146, 148, 150, 152 are assigned addresses as described above.

In one embodiment, the wireline-interface module 304 is coupled to the surface through the signal interface 308 and the wireline cable 110 and is capable of receiving and transmitting messages through the wireline cable 110. In one embodiment, such messages originate from the shooting panel 106 on the surface. In one embodiment, such messages originate from other equipment on the surface or from other equipment in the well bore 114.

In one embodiment, the wireline-interface module 304 includes circuitry, including for example a processor, such as processor 702 (see FIG. 7), to demodulate and decode the messages it receives through the wireline cable 110.

In one embodiment, the wireline-interface module 304 transmits a "FIRE" message through the wireline-interface-module transceiver 306, where the transmission is signified by lightning bolt 802. In one embodiment, the "FIRE" message has the form:

message_start, destination_address, message_end

In one embodiment, the message_start is a symbol or series of symbols that equipment such as tandem-sub-upside transceiver 130/404 can clearly identify as the beginning of a "FIRE" message such as a series of alternating "highs" and "lows" within a defined period. In one embodiment, the message_end is similar to, but clearly distinguishable from, the message pre-amble. In one embodiment, the destination_address is a symbol or series of symbols that represent the address of the gun sub 142, 144, 146, 148, 150, 152 to be detonated. In the example currently being discussed, the gun-sub address is the address of gun sub 152 at the bottom of the perforation apparatus 122.

In one embodiment, in which additional types of messages can be sent and in which bi-directional communications between the equipment in the perforating apparatus 122 is possible, the message has the form:

message_start, sender_address, destination_address, message_type, message_end
where:

message_start is a digital pattern signaling the start of a message;

sender_address is a variable length field representing the address of the sender (which can the the wireline interface sub 128, any of the tandem subs 130, 132, 134, 136, 138, 140, any of the gun subs 142, 144, 146, 148, 150, 152, or any other equipment in the perforation apparatus 122);

destination_address is a variable length field representing the address of the sender (which can the the wireline interface sub 128, any of the tandem subs 130, 132, 134, 136, 138, 140, any of the gun subs 142, 144, 146, 148, 150, 152, or any other equipment in the perforation apparatus 122);

message_type indicates the type of message being transmitted, such as command (e.g., WAKEUP, SLEEP, BROADCAST, TX_CONFIGURE, FIRE, SEND_DATA, DISABLE, MSG_CONFIRM, MSG_RESEND, etc.), data, acknowledgement; and message_end is a digital pattern signaling the end of a message.

In one embodiment, the tandem-sub-upside transceiver 130/404 receives the "FIRE" message, demodulates it, and passes it to the tandem-sub-downside transceiver 130/406, which modulates it onto an RF carrier and transmits it into the gun-sub housing 142/502 of gun sub 142, where the transmission is signified by the lightning bolt 804.

In one embodiment, the gun-sub transceiver 142/508 receives the "FIRE" message and decodes it. The gun-sub transceiver 142/508 or other circuitry or equipment (not shown) within the gun sub 142 using, for example, a processor, such as processor 702, compares the gun-sub address in the "FIRE" message to the address that has been assigned to the gun sub 142 and determines that the "FIRE" message is not intended for the gun sub 142. The gun-sub transceiver 142/508 then retransmits the "FIRE" message, where the transmission is signified by the lightning bolt 806. In this instance, the gun-sub transceiver 142/508 operates as both a receiver and a transmitter.

In one embodiment, the "FIRE" message is received by the tandem-sub-upside antenna 132/408 and is processed by tandem subs 132, 134, 136, and 138 and gun subs 144, 146, 148, and 150 in the same way was they were processed by tandem sub 132 and gun sub 142.

In one embodiment, the "FIRE" message is eventually received by tandem-sub-upside transceiver 140/404 through tandem-sub-upside-antenna 140/408, where the received transmission is signified by the lightning bolt 808.

In one embodiment, the tandem-sub-upside transceiver 140/404 receives the "FIRE" message, demodulates it, and passes it to the tandem-sub-downside transceiver 140/406, which modulates it onto an RF carrier and transmits it into the gun-sub housing 152/502 of gun sub 152, where the transmission is signified by the lightning bolt 810.

In one embodiment, the gun-sub transceiver 152/508 receives the "FIRE" message and decodes it. The gun-sub transceiver 152/508 or other circuitry or equipment (not shown) within the gun sub 152 using, for example, a processor, such as processor 702, compares the gun-sub address in the "FIRE" message to the address that has been assigned to the gun sub 152 and determines that the "FIRE" message is intended for the gun sub 152.

The gun sub 152 then begins a sequence to set off its associated detonator 152/512. In one embodiment, the sequence involves receiving a trigger number, which in one embodiment is two and in other embodiments is more than two, of "FIRE" messages containing the address of gun sub 152. In one embodiment, the trigger number of messages must be received within a trigger time period of each other in order to complete the sequence and detonate the detonator 152/512. In one embodiment, in which communications are bi-directional within the perforation apparatus 122, the gun sub sends an "acknowledge request" message to the wireline-interface module 304 or to the shooting panel 106 and does not trigger the detonator 152/512 until it receives a "acknowledged" message responding to the "acknowledgement request" message.

In one embodiment, the detonation of the perforation charges 152/602, 152/604, 152/606, 152/608, 152/610, 152/612, and 152/614 (not shown in FIG. 8) destroys the gun sub 152 and renders the tandem sub 140 inoperable since its tandem-sub-downside antenna 140/410 is destroyed by the explosion. In one embodiment, the electronics inside the tandem sub 140 remain intact and reusable. In one embodiment, the detonation of the gun sub 150 above the tandem sub 140 destroys the tandem-sub-upside antenna 140/408. The antennas are intended to be expendable items that can be attached and detached from the tandem subs 130, 132, 134, 136, 138, 140. Otherwise, the tandem subs 130, 132, 134, 136, 138, 140 can be reused.

The same sequence is followed to detonate the other gun subs 142, 144, 146, 148, and 150.

In one embodiment, the gun subs 142, 144, 146, 148, 150, 152 and the tandem subs 130, 132, 134, 136, 138, 140 allow full bidirectional communication and the tandem subs 130, 132, 134, 136, 138, 140 are addressable. In one embodiment, the tandem subs 130, 132, 134, 136, 138, 140 include sensors, such as accelerometers, humidity sensors (which can be used, for example, to detect when adjacent gun subs have been flooded), pressure sensors (which can be used to detect gun sub flooding), temperature sensors, etc., and the tandem subs 130, 132, 134, 136, 138, 140 are equipped with the necessary electronics to gather information from the sensors and transmit the information to the wireline-interface module 304 or to the shooting panel 106 or to other equipment on the surface or in the well bore 114.

In one embodiment, the gun subs 142, 144, 146, 148, 150, 152, which are individually addressable, can be queried by the wireline-interface module 304 or the shooting panel 106 to provide diagnostic data, such as the impedance of the gun-sub detonator 512 which can be an indication of the presence of, and a good connection to, the gun-sub detonator 512.

In one embodiment, the grounds of the wireline interface sub 128, the tandem subs 130, 132, 134, 136, 138, 140, and the gun subs 142, 144, 146, 148, 150, 152 are floating, which improves immunity to electrical disturbances. This provides additional safety and noise immunity for the perforation apparatus 122.

Figure 9:
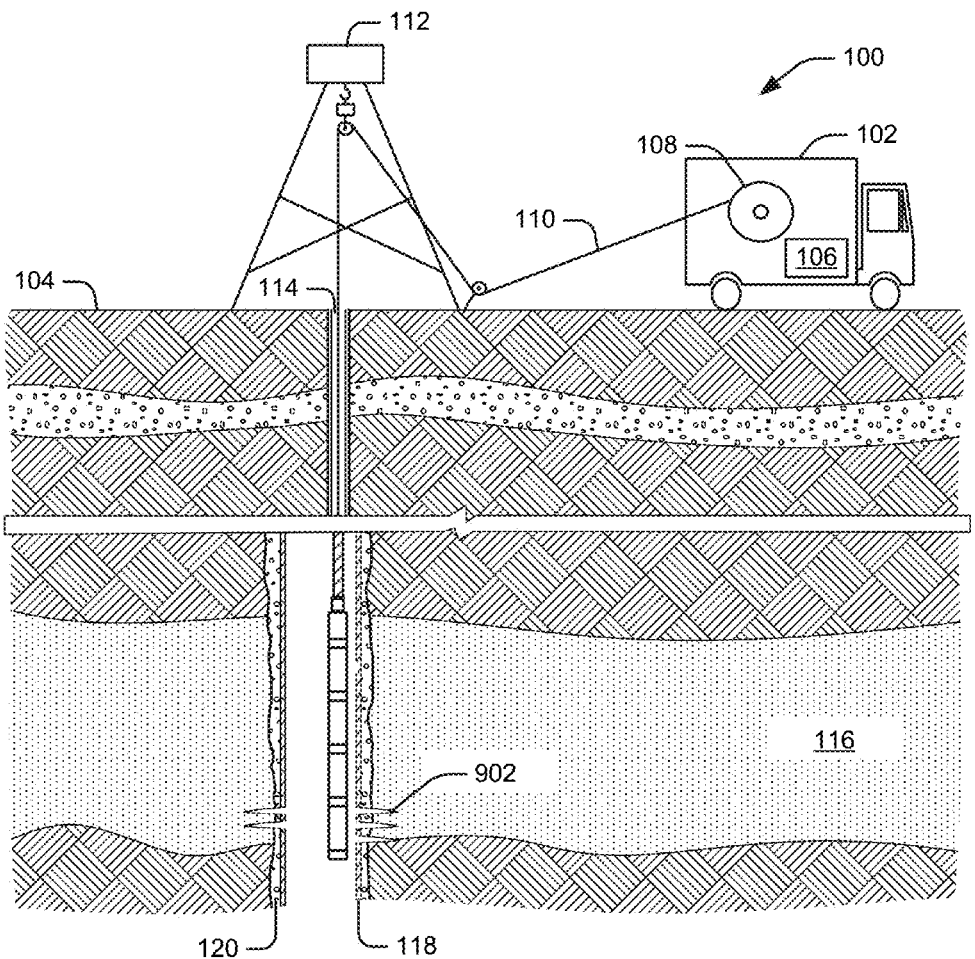
FIG. 9 illustrates the effect of the explosion of a perforating charge.

FIG. 9 shows the result of the explosion of the gun sub 152. Passages 902 (only one is labeled) have been created from the formation 116 through the concrete 120 and the casing 118. As a result, fluids can flow out of the formation 116 to the surface 104. Further, stimulation fluids may be pumped out of the casing 118 and into the formation 116 to serve various purposes in producing fluids from the formation 116.

Figure 10:
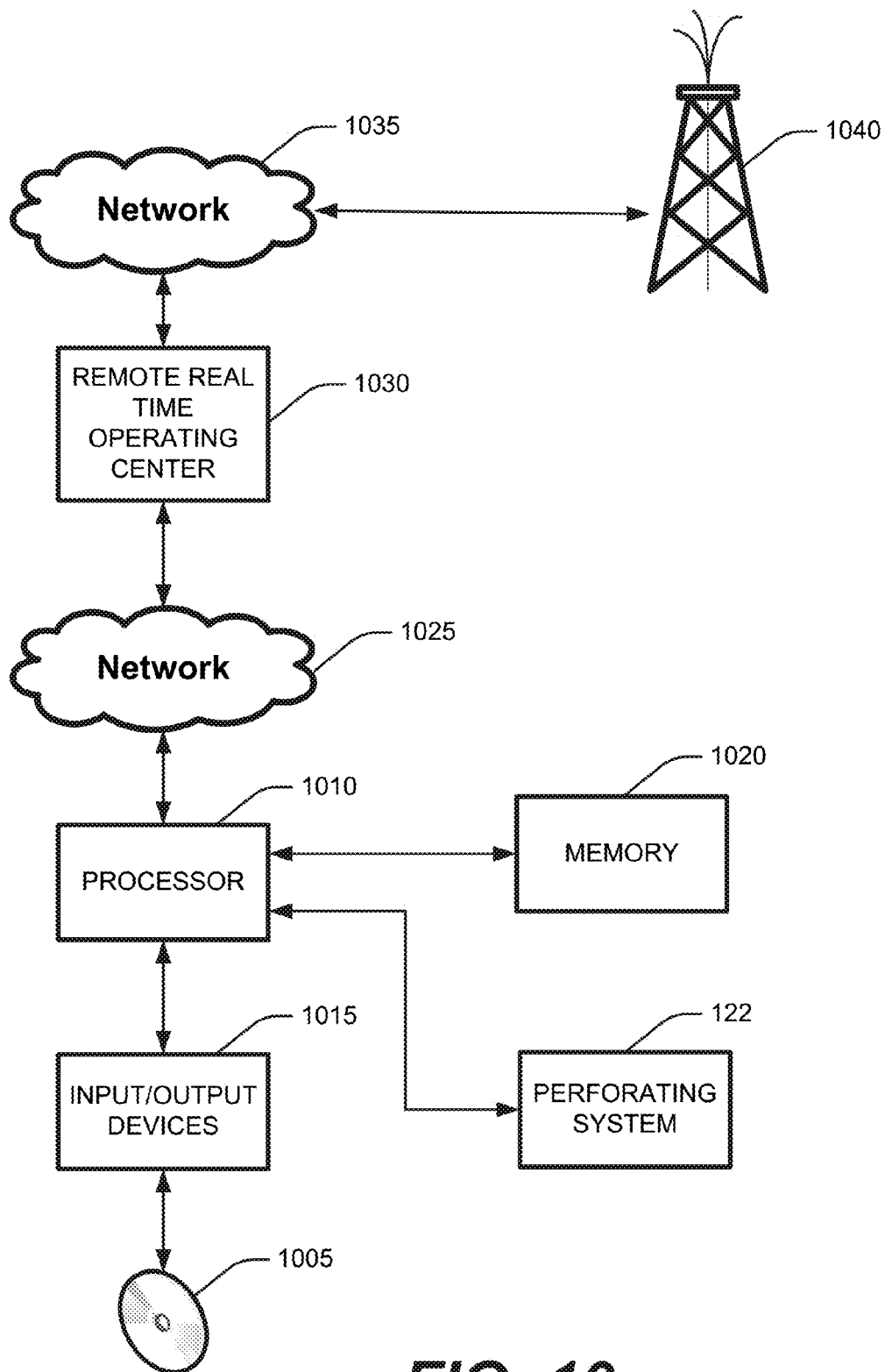
FIG. 10 illustrates an environment for a perforation apparatus.

In one embodiment, illustrated in FIG. 10, the perforating system 122 is controlled by software in the form of a computer program on a computer readable media 1005, such as a CD, a DVD, a portable hard drive or other portable memory, as shown in FIG. 10. In one embodiment, a processor 1010, which may be the same as or included in the firing panel 106 or may be located with the perforation apparatus 122, reads the computer program from the computer readable media 1005 through an input/output device 1015 and stores it in a memory 1020 where it is prepared for execution through compiling and linking, if necessary, and then executed. In one embodiment, the system accepts inputs through an input/output device 1015, such as a keyboard or keypad, and provides outputs through an input/output device 1015, such as a monitor or printer. In one embodiment, the system stores the results of calculations in memory 1020 or modifies such calculations that already exist in memory 1020.

In one embodiment, the results of calculations that reside in memory 1020 are made available through a network 1025 to a remote real time operating center 1030. In one embodiment, the remote real time operating center 1030 makes the results of calculations available through a network 1035 to help in the planning of oil wells 1040 or in the drilling of oil wells 1040.

In one embodiment, the gun subs 142, 144, 146, 148, 150, 152 and the tandem subs 130, 132, 134, 136, 138, 140 use standard off-the-shelf components and technologies.

In one embodiment, a malfunction in any gun sub 142, 144, 146, 148, 150, 152 will not affect the functionality of other guns. For example, even if the gun-sub transceiver 142/508 fails in gun sub 142, communications with gun sub 152 can proceed because tandem-sub-downside transceiver 130/406 can communicate with tandem-sub-upside transceiver 132/404 through tandem-sub-upside antenna 132/408.

The word "coupled" herein means a direct connection or an indirect connection.

The text above describes one or more specific embodiments of a broader invention. The invention also is carried out in a variety of alternate embodiments and thus is not limited to those described here. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus comprising:
    a wireline interface sub comprising:
        a wireline-interface-sub housing mechanically coupleable to a wireline, and
        a wireline-interface module electrically coupleable to the wireline;
    a first tandem sub comprising:
        a first-tandem-sub housing mechanically coupled to the wireline-interface-sub housing,
        a first-tandem-sub-upside transceiver wirelessly coupled to the wireline-interface module, and
        a first-tandem-sub-downside transceiver electrically coupled to the first-tandem-sub-upside transceiver; and
    a first gun sub comprising:
        a first-gun-sub housing mechanically coupled to the first-tandem-sub housing,
        a first-gun-sub transceiver wirelessly coupled to the first-tandem-sub-downside transceiver, and
        a first-gun-sub detonator coupled to, and triggerable by, the first-gun-sub transceiver, and
        a first first-tandem-sub downside antenna physically coupled to the first-tandem-sub downside transceiver and physically extending into the first-gun-sub housing;
    a second gun sub comprising a second-gun-sub housing, the second gun sub mechanically coupleable to the first-tandem-sub housing to replace the first gun sub after detonation of the first-gun-sub detonator; and
    a second first-tandem-sub downside antenna coupleable to the first tandem-sub-downside transceiver and extendable into the second-gun-sub housing, the second first-tandem-sub downside antenna to replace the first first-tandem-sub downside antenna after detonation of the first-gun-sub detonator.

2. The apparatus of claim 1 wherein:
    the first gun sub further comprises:
        a first-gun-sub antenna electrically coupled to the first-gun-sub transceiver.

3. The apparatus of claims 1 wherein the wireline interface sub further comprises:
    a wireline-interface-module antenna electrically coupled to the wireline-interface module.

4. The apparatus of claims 1 further comprising:
    a second tandem sub comprising:
        a second-tandem-sub-housing mechanically coupled to the first-gun-sub housing, and
        a second-tandem-sub-upside transceiver wirelessly coupled to the first-tandem-sub-downside transceiver; and
        a second-tandem-sub-downside transceiver electrically coupled to the second-tandem-sub-upside transceiver.

5. The apparatus of claim 4 further comprising:
    a second gun sub comprising:
        a second-gun-sub housing mechanically coupled to the second-tandem-sub housing,
        a second-gun-sub transceiver wirelessly coupled to the second-tandem-sub-downside transceiver, and
        a second-gun-sub detonator coupled to, and triggerable by, the second-gun-sub transceiver.

6. The apparatus of claims 1 wherein the first-gun-sub transceiver comprises:
    a first-gun-sub processor commandable to trigger the first-gun-sub detonator upon receipt of a first-gun-sub-addressed message from the wireline-interface module through the first-tandem-sub-upside transceiver, the first-tandem-sub-downside transceiver, and the first-gun-sub transceiver.

7. The apparatus of claims 1 where the first-gun-sub wireline transceiver comprises:
    a first-gun-sub processor commandable to trigger the first-gun-sub detonator upon receipt within a predetermined period of time of a predetermined plurality of first-gun-sub-addressed messages ordering the first gun sub to fire.

8. A method comprising:
    mechanically coupling:
        a first-tandem-sub housing of a first tandem sub to a wireline-interface-sub housing of a wireline interface sub, and
        a first-gun-sub housing of a first gun sub to the first-tandem-sub housing; electrically coupling:
        a first-tandem-sub-downside transceiver in the first tandem sub to a first-tandem-sub-upside transceiver within the first tandem sub, and
        a first-gun-sub detonator in the first gun sub to a first-gun-sub transceiver in the first gun sub; and wirelessly coupling:
the first-tandem-sub-upside transceiver to a wireline-interface module in the wireline interface sub, and
a first-gun-sub transceiver in a first gun sub to the first-tandem-sub-downside transceiver;
mechanically coupling a first tandem-sub-downside antenna to the first-tandem-sub housing such that the first tandem-sub-downside antenna physically extends into the first gun sub;
electrically coupling the first tandem-sub-downside antenna to the first-tandem-sub-downside transceiver;
providing a second gun sub mechanically coupleable to the first-tandem-sub housing after detonation of the first-gun-sub detonator; and
providing a second tandem-sub-downside antenna coupleable to the first-tandem-sub housing and extendable into the second gun sub, the second first-tandem-sub downside antenna to replace the first first-tandem-sub downside antenna after detonation of the first-gun-sub detonator.

9. The method of claim 8 further comprising:
mechanically coupling the wireline interface sub to a wireline; and
electrically coupling the wireline-interface module in the wireline interface sub to the wireline.

10. The method of claim 9 further comprising:
electrically coupling the wireline to a firing panel; and
lowering the wireline interface sub, the first tandem sub, the first gun sub, and the second tandem sub into a borehole.

11. The method of claim 10 further comprising:
the firing panel transmitting a firing-panel-issued command to the wireline-interface module through the wireline;
a wireline-interface-module processor within the wireline-interface module processing the firing-panel-issued command and wirelessly transmitting a not-first-gun-sub-addressed command to the first-tandem-sub-upside transceiver;
the first tandem-sub-upside transceiver receiving the not-first-gun-sub-addressed command and electrically communicating the command to the first-tandem-sub-downside transceiver;
the first-tandem-sub-downside transceiver wirelessly transmitting the not-first-gun-sub-addressed command to the first-gun-sub transceiver;
a first-gun-sub processor within the first gun sub receiving the not-first-gun-sub-addressed command from the first-gun-sub transceiver; and
the first-gun-sub processor determining that the not-first-gun-sub-addressed command is not addressed to the first gun sub, and, as a result, not taking any action.

12. The method of claim 10 further comprising:
the firing panel transmitting a firing-panel-issued command to the wireline-interface module through the wireline;
a wireline-interface-module processor within the wireline-interface module processing the firing-panel-issued command and wirelessly transmitting a first-gun-sub-addressed command to the first-tandem-sub-upside transceiver;
the first tandem-sub-upside transceiver receiving the first-gun-sub-addressed command and electrically communicating the first-gun-sub-addressed command to the first-tandem-sub-downside transceiver;
the first-tandem-sub-downside transceiver wirelessly transmitting the first-gun-sub-addressed command to the first-gun-sub transceiver and the second-tandem-sub-upside transceiver;
a first-gun-sub processor within the first gun sub receiving the first-gun-sub-addressed command from the first-gun-sub transceiver; and
the first-gun-sub processor determining that the first-gun-sub-addressed command is addressed to the first gun sub, and, as a result, sending a signal to the first-gun-sub detonator to cause it to detonate.

13. The method of claim 10 further comprising:
the firing panel transmitting a firing-panel-issued command to the wireline-interface module through the wireline;
a wireline-interface-module processor within the wireline-interface module processing the firing-panel-issued command and wirelessly transmitting a first-gun-sub-addressed command to the first-tandem-sub-upside transceiver;
the first tandem-sub-upside transceiver receiving the first-gun-sub-addressed command and electrically communicating the first-gun-sub-addressed command to the first-tandem-sub-downside transceiver;
the first-tandem-sub-downside transceiver wirelessly transmitting the first-gun-sub-addressed command to the first-gun-sub transceiver and the second-tandem-sub-upside transceiver;
a first-gun-sub processor within the first gun sub receiving the first-gun-sub-addressed command from the first-gun-sub transceiver; and
the first-gun-sub processor determining that the first-gun-sub-addressed command is addressed to the first gun sub, and, as a result:
incrementing a detonation counter,
determining that the value of the detonation counter equal to or greater than a detonation threshold, and, as a result,
sending a signal to the first-gun-sub detonator to cause it to detonate.

14. The method of claim 10 further comprising:
the firing panel transmitting a firing-panel-issued command to the wireline-interface module through the wireline;
a wireline-interface-module processor within the wireline-interface module processing the firing-panel-issued command and wirelessly transmitting a first-gun-sub-addressed command to the first-tandem-sub-upside transceiver;
the first tandem-sub-upside transceiver receiving the first-gun-sub-addressed command and electrically communicating the first-gun-sub-addressed command to the first-tandem-sub-downside transceiver;
the first-tandem-sub-downside transceiver wirelessly transmitting the first-gun-sub-addressed command to the first-gun-sub transceiver and the second-tandem-sub-upside transceiver; and
a first-gun-sub processor within the first gun sub receiving the first-gun-sub-addressed command from the first-gun-sub transceiver; and
the first-gun-sub processor determining that the first-gun-sub-addressed command is addressed to the first gun sub and was received within a trigger time period of a previously-received-first-gun-sub-addressed command that was addressed to the first gun sub, and, as a result:
detonating a detonator.

15. The method of claim 10 further comprising:
the firing panel transmitting a firing-panel-issued command to the wireline-interface module through the wireline;
a wireline-interface-module processor within the wireline-interface module processing the firing-panel-issued command and wirelessly transmitting a first-gun-sub-addressed command to the first-tandem-sub-upside transceiver;
the first tandem-sub-upside transceiver receiving the first-gun-sub-addressed command and electrically communicating the first-gun-sub-addressed command to the first-tandem-sub-downside transceiver;
the first-tandem-sub-downside transceiver wirelessly transmitting the first-gun-sub-addressed command to the first-gun-sub transceiver and the second-tandem-sub-upside transceiver;
a first-gun-sub processor within the first gun sub receiving the first-gun-sub-addressed command from the first-gun-sub transceiver, determining that the first-gun-sub-addressed command is addressed to the first gun sub, and, as a result:
transmitting an acknowledgement request to the firing panel through the first-tandem-sub-downside transceiver, the first-tandem-sub-upside transceiver, and the wireline-interface module; and
receiving an acknowledgement from the firing panel through the wireline-interface module, the first-tandem-sub-upside transceiver, and the first-tandem-sub-downside transceiver, and, as a result, detonating a detonator.

16. A method comprising:
mechanically coupling:
a first tandem-sub-downside antenna to an upper tandem sub at an upper-tandem-sub-downside-antenna connection, and
a first-gun-sub housing of a first gun sub to an upper-tandem-sub housing of the upper tandem sub such that the first upper-tandem-sub-downside antenna extends into the first-gun-sub housing; and
detonating a first-gun-sub detonator thereby destroying the first upper-sub-downside antenna;
decoupling the first-gun-sub housing from the upper-tandem-sub housing and removing any remains of the first upper-tandem-sub-downside antenna; and
mechanically coupling:
a second upper-tandem-sub-downside antenna to the upper tandem sub at the upper-tandem-sub-downside-antenna connection, and
a second-gun-sub housing of a second gun sub to the upper-tandem-sub housing of the upper tandem sub such that the second upper-tandem-sub-downside antenna extends into the second-gun-sub housing.

17. The method of claim 16 wherein:
mechanically coupling the first tandem-sub-downside antenna and the second tandem-sub-downside antenna to the tandem sub at the tandem-sub-downside-antenna connection comprises using a connector selected from the group consisting of screw connector and a bayonet connector.

18. The method of claims 16 further comprising:
mechanically coupling:
a first tandem-sub-upside antenna to a lower tandem sub at a lower-tandem-sub-upside-antenna connection,
the first-gun-sub housing of the first gun sub to a lower-tandem-sub housing of the lower tandem sub such that the first lower-tandem-sub-upside antenna extends into the first-gun-sub housing;
wherein detonating the first-gun-sub detonator destroys the first tandem-sub-upside antenna;
decoupling the first-gun-sub housing from the lower-tandem-sub housing and removing any remains of the first lower-tandem-sub-upside antenna; and
mechanically coupling:
a second tandem-sub-upside antenna to the lower tandem sub at the lower-tandem-sub-upside-antenna connection, and
a third-gun-sub housing of a third gun sub to the lower-tandem-sub housing of the lower tandem sub such that the second tandem-sub-upside antenna extends into the third-gun-sub housing.

19. The method of claim 18 wherein:
the second gun sub is the third gun sub; and
the second-gun-sub housing is the third-gun-sub housing.

* * * * *